US012578983B2

(12) United States Patent
Zuccarelli et al.

(10) Patent No.: US 12,578,983 B2
(45) Date of Patent: Mar. 17, 2026

(54) POLYMORPHIC UNIKERNAL FACTORY FOR NODE MANAGEMENT

(71) Applicant: Red Hat, Inc., Raleigh, NC (US)

(72) Inventors: Luigi Mario Zuccarelli, Dublin (IE); Leigh Griffin, Waterford (IE)

(73) Assignee: Red Hat, Inc., Raleigh, NC (US)

( * ) Notice: Subject to any disclaimer, the term of this patent is extended or adjusted under 35 U.S.C. 154(b) by 861 days.

(21) Appl. No.: 17/876,226

(22) Filed: Jul. 28, 2022

(65) Prior Publication Data

US 2024/0036903 A1 Feb. 1, 2024

(51) Int. Cl.
*G06F 9/455* (2018.01)
*G16Y 40/40* (2020.01)

(52) U.S. Cl.
CPC .................... *G06F 9/45558* (2013.01); *G06F 2009/45562* (2013.01); *G06F 2009/4557* (2013.01); *G06F 2009/45595* (2013.01); *G16Y 40/40* (2020.01)

(58) Field of Classification Search
CPC .............. G06F 2009/45562; G06F 2009/4557
See application file for complete search history.

(56) References Cited

U.S. PATENT DOCUMENTS

| | | | |
|---|---|---|---|
| 10,674,411 | B2 | 6/2020 | Crawford |
| 10,983,847 | B2 | 4/2021 | Drepper |
| 11,150,937 | B2 | 10/2021 | Heindl et al. |

| | | | | |
|---|---|---|---|---|
| 11,321,107 | B1 * | 5/2022 | Eyberg | ................ G06F 9/45545 |
| 12,228,897 | B2 * | 2/2025 | Lamothe | .......... G05B 19/41835 |
| 2017/0102962 | A1 * | 4/2017 | Cismas | ................. H04L 41/082 |
| 2018/0165110 | A1 * | 6/2018 | Htay | .......................... G06F 8/65 |
| 2020/0159536 | A1 * | 5/2020 | Saidi | ................... G06F 9/45558 |
| 2025/0086322 | A1 * | 3/2025 | Griffin | ................... G06F 21/64 |
| 2025/0190569 | A1 * | 6/2025 | Griffin | ................. G06F 21/572 |

FOREIGN PATENT DOCUMENTS

WO 2021091436 A1 5/2021

OTHER PUBLICATIONS

Morabito, et al; "Consolidate IoT Edge Computing with Lightweight Virtualization"; IEEE Network, vol. XX, No. X; Jan. 2018; (10 pages).

(Continued)

*Primary Examiner* — Lewis A Bullock, Jr.
*Assistant Examiner* — Christian M Bakhit
(74) *Attorney, Agent, or Firm* — Kilpatrick Townsend & Stockton LLP

(57) ABSTRACT

The present disclosure provides new and innovative systems and methods for managing nodes using polymorphic unikernals. In an example, a method includes generating, by a polymorphic unikernal service (PUS) system having a processor, a virtual machine. A generic unikernal may be created, retrieved, and/or embedded within the virtual machine. The PUS system may receive, from an Internet of Things (IoT) device (e.g., one of a plurality of nodes communicatively linked to the PUS system), a configuration file indicating a configuration of the IoT device. The PUS system may modify the generic unikernal to generate a modified unikernal based on the configuration of the IoT device. Furthermore, the PUS system may deploy the virtual machine on the IoT device. The deployed virtual machine may be embedded with the modified unikernal.

20 Claims, 5 Drawing Sheets

(56) References Cited

OTHER PUBLICATIONS

Duncan, et al.; "Enterprise IoT Security and Scalability: How Unikernels can Improve the Status Quo"; 2016; ACM. ISBN 978-1-4503-4616-0; (6 pages).
Cozzolino, et al; "FADES: Fine-Grained Edge Offloading with Unikernels"; Aug. 25, 2017; Proceedings of HotConNet '17, Los Angeles, CA, USA; https://doi.org/10.1145/3094405.3094412; (6 pages).
Bratterud, et al.; "Enhanging Cloud Security and Privacy: The Unikernel Solution"; 2017; The Eighth International Conference on Cloud Computing, GRIDs, and Virtualization; (8 pages).

* cited by examiner

200

202 — Generate a virtual machine

204 — Embed a generic unikernel within the virtual machine

206 — Receive configuration information for an IoT device

208 — Modify the generic unikernel to generate a modified unikernel

210 — Deploy the virtual machine embedding the modified unikernel on the IoT device

POLYMORPHIC UNIKERNAL FACTORY FOR NODE MANAGEMENT

BACKGROUND

A unikernel (or "unikernal") is a specialized, single address space machine image constructed that can be deployed to cloud or embedded environments. For example, a developer can select, from a modular stack, a minimal set of libraries, which correspond to the operating system constructs, required for an application to run. These libraries can then be compiled with the application and configuration code to build the unikernel. Furthermore, a unikernal can run directly on a hypervisor or hardware without an intervening operating system. Thus, a unikernal has low deployment costs as it may only need an application binary to run.

SUMMARY

The present disclosure provides new and innovative systems and methods for managing nodes using polymorphic unikernals. In an example, a method includes generating, by a polymorphic unikernal service (PUS) system having a processor, a virtual machine. A generic unikernal may be created, retrieved, and/or embedded within the virtual machine. The PUS system may receive, from an Internet of Things (IoT) device (e.g., one of a plurality of nodes communicatively linked to the PUS system), a configuration file indicating a configuration of the IoT device. The PUS system may modify the generic unikernal to generate a modified unikernal based on the configuration of the IoT device. Furthermore, the PUS sytem may deploy the virtual machine on the IoT device. The deployed virtual machine may be embedded with the modified unikernal.

In some embodiments, PUS system may interrogate (e.g., query) each of a plurality of IoT devices, including the IoT device, for hardware capabilities for the respective IoT devices. The IoT devices may send, and the PUS system may receive, a respective response to the interrogation. In some aspects, the configuration file may be derived from or may comprise the response to the interrogation.

In an example, a PUS system for managing nodes (e.g., of an IOT device network) is disclosed. The PUS system may include a processor and a memory storing computer-executable instructions. When the instructions are executed by the processor, the instructions cause the processor to: generate a virtual machine; embed a generic unikernal within the virtual machine; receive, from an Internet of Things (IoT) device communicatively linked to the PUS system, a configuration file indicating a configuration of the IoT device; modify, based on the configuration of the IoT device, the generic unikernal to generate a modified unikernal; and deploy the virtual machine on the IoT device, wherein the virtual machine embeds the modified unikernal.

In another example, a non-transitory computer-readable medium is disclosed for use on a computer system containing computer-executable programming instructions for performing one or more methods described herein.

Additional features and advantages of the disclosed method and apparatus are described in, and will be apparent from, the following Detailed Description and the Figures. The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

DETAILED DESCRIPTION OF EXAMPLE EMBODIMENTS

The Internet of Things (IoT) is an example of a node network comprising devices with sensors, processing ability, software, and other technologies that connect and exchange data with other devices and systems over a communication networks. IoT devices can be resource constrained. Application developers may need to be acutely aware of the footprint and the variety of IoT devices in operation. As these IoT device may vary in their hardware and networking capabilities, a uniform solution to apply across the network of IoT devices is difficult. Furthermore, there has been an increase in distributed denial of service (DDoS) and other security attacks that overwhelm node networks comprising IoT devices. There is thus a desire and need to improve the resilience and reliability of node networks comprising IoT devices.

As previously discussed, a unikernel is a sealed, fixed-purpose machine image that can be directly deployed to cloud or embedded environments at low cost, without the need for an intervening operating system. Furthermore, unikernals provide inherent resilience against security threats as the unikernal relies on application binaries. Unlike library-dependent software, application binaries itself are very difficult to hack as they are in machine code. However, it may be difficult for unikernals to be effectively created within IoT devices due to IoT devices having limited hardware constraints (e.g., limited processor, use of embedded controller, etc.).

The present disclosure describes solutions for effectively managing node networks (e.g., of IoT devices) using unikernals, which reap the aforementioned benefits of unikernals while overcoming the aforementioned challenges. For example, various embodiments of the present disclosure describe a method of utilizing unikernels that initially relies on a generic unikernal but then modifies and customizes the unikernel until it is highly specialized and compatible with target IoT devices in an assembly line management methodology. The methodology is referred to herein as a Polymorphic Unikernel Service (PUS). In some embodiments, PUS may leverage kvirt support to manage the construction and customization of unikernals facilitating the distribution and eventual deployment of the specialized unikernels. In some embodiments, the specialized unikernal intended for deployment may be embedded within a virtual machine that is accessible at the target IoT device.

Figure 1:
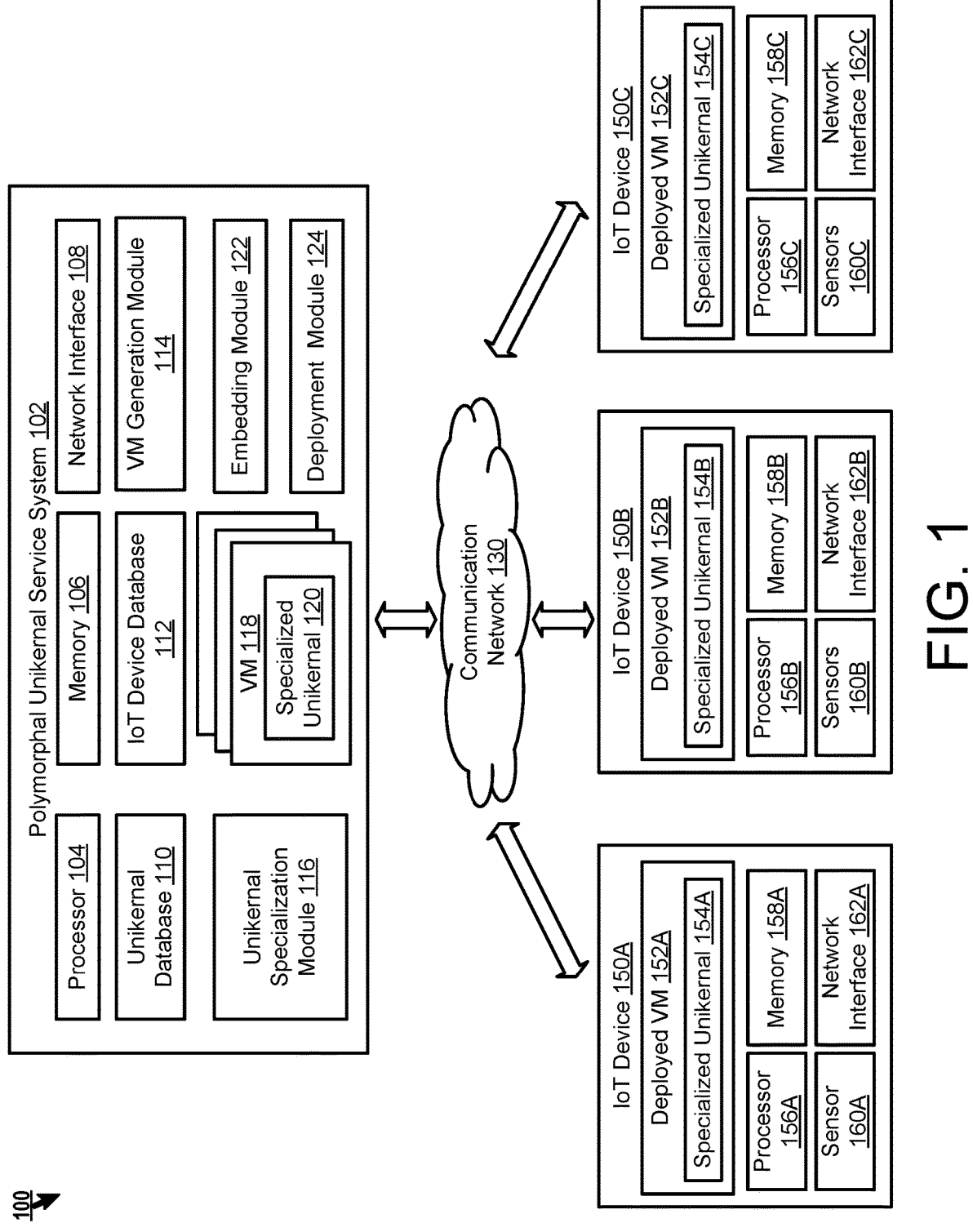
FIG. 1 is a block diagram of an example computer network environment for a polymorphic unikernal service system for node management, according to an example embodiment of the present disclosure.

FIG. 1 is a block diagram of an example computer network environment 100 for a polymorphic unikernal service system for node management, according to an example embodiment of the present disclosure. The computer network environment 100 may include a polymorphal unikernal service (PUS) system 102 and a plurality of nodes of IoT devices (e.g., IoT devices 150A-150C) communicatively linked to the PUS system 102 via a communication network 130. The PUS system 102 may be configured to manage the plurality of IoT devices 150A-150C or similar nodes of a node network. In some aspects, the PUS system 102 may be one or more of a remote or local server, a computing device (e.g., a laptop, tablet, smartphone, etc.), a special purpose computer, or another IoT device tasked to perform functions of a node manager or node network administrator. As shown in FIG. 1, the PUS system 102 may comprise one or more of a processor 104, a memory 106, a network interface 108, a unikernal database 110, an IoT device database 112, a virtual machine (VM) generation module 114, a unikernal specialization module 116, a plurality of virtual machines 118, an embedding module 122, and a deployment module 124.

The processor 104 may comprise any one or more types of digital circuit configured to perform operations on a data stream, including functions described in the present disclosure. The memory 106 may comprise any type of long term, short term, volatile, nonvolatile, or other memory and is not to be limited to any particular type of memory or number of memories, or type of media upon which memory is stored. Furthermore, the memory 106 may store computer-executable instructions that, when executed by the processor 104, can cause the processor 104 to perform one or more processes described herein. The network interface 108 may allow the PUS system 102 to communicate with IoT devices and/or other nodes of a node network (e.g., IoT devices 150A-150C, etc.) over the communication network 130. For example, the network interface 108 may comprise a wired interface (e.g., electrical, radiofrequency (RF) (e.g., via a coaxial cable), optical interface (via fiber)), a wireless interface, a modem, etc. In some aspects, the IoT devices may also have a respective network interface to facilitate communication (e.g., network interfaces 162A-162C).

As will be described in relation to FIG. 2, the PUS system 102 may include a registry or repository of unikernals, which have been created and/or customized, and a record of IoT devices communicatively linked to, and/or managed by, the PUS system 102. The unikernals may be stored in the unikernal database 110 and the record of IoT devices may be stored in the IoT device database 112.

The VM generation module 114 may comprise any portion or entirety of a software, application, program, or plug-in that causes the PUS system 102 to generate a virtual machine on which a unikernal may be embedded. For example, the PUS system 102 may run (e.g., as instances) one or more virtual machines 118 generated by the VM generation module 114. The embedded unikernal may originally be a generic unikernal that may become modified or customized (e.g., to become a specialized unikernal 120 embedded within one of the virtual machines 118) in a process described herein. In some aspects, the VM generation module 114 may partition the resources the PUS system 202 and create an instance that can be shared and/or deployed to one or more IoT devices.

The unikernal specialization module 110 may comprise any portion or entirety of a software, application, program, or plug-in that causes the PUS system 102 to perform modifications to one or more parameters of a unikernal. Such parameters may include, for example, a set of libraries corresponding to operating system services. The services chosen, via the selection of libraries, may differ based on the needs of the IoT device, and thus the unikernal may be customized accordingly. In some emnodiments, the parameters for a unikernal may further include, but are not limited to, security parameters, keys, IT policy, HTTPS gateway interface requirements, memory interface/storage, and/or data schemas. In some aspects, the unikernal specialization module 110 may rely on configuration and/or compatibility information associated with an IoT device to determine how a unikernal is to be customized.

The embedding module 122 may comprise any portion or entirety of a software, application, program, or plug-in that causes the PUS system 102 to embed a unikernal (e.g., a generic unikernel, a customized unikernel, etc.) to a virtual machine. For example, the embedding module 122 may allow the unikernal to control one or more operations of the virtual machine (e.g., virtual machine 118). The deployment module 124 may comprise any portion or entirety of a software, application, program, or plug-in that causes the PUS system 102 to deploy or send a virtual machine embedded with a unikernal to a node or IoT device (also referred to herein as target node or target IoT device). In some embodiments, the virtual machines generated by the PUS system 102 (e.g., via the VM generation module 114) may run on the PUS system 102, while the IoT devices may share the same running instance of the operating system as the host PUS system. In such embodiments, the deployment module 124 may cause the PUS system 102 to distribute, to IoT devices, the instance of the virtual machine running on the host PUS system 102. The instance may include the embedded unikernal, which may be or may become customized according to the processes described herein.

The plurality of IoT devices 150A-150C may each include one or more of a processor (e.g., processor 156A-156C), memory (e.g., memory 158A-158C), and a network interface (e.g., 162A-162C). The processor and memory may share one or more components or functionalities as described for processor 104 and memory 106. However, as previously discussed, IoT devices can be resource constrained, and thus processors 156A-156C and memories 158A-158C may be limited in their capabilities in comparison to processor 104 and memory 106. As may be applicable to the purpose for which the network of IoT devices are used (e.g., a smart home system, a telematics system, digital health, etc.), an IoT device may additionally have a sensor (e.g., sensors 160A-160C) to measure a physical or chemical data. Furthermore, as unikernals are generated and/or customized according to the configuration, compatibility, and/or needs of an IoT device, the virtual machines embedding such unikernals may be deployed to the IoT device (e.g., as deployed virtual machines 152A-152C embedding specialized unikernals 154A-154C, respectively). In some aspects, those specialized unikernals may uniquely allow the IoT devices to process and/or transform data received from the respective sensors of the IoT devices.

Figure 2:
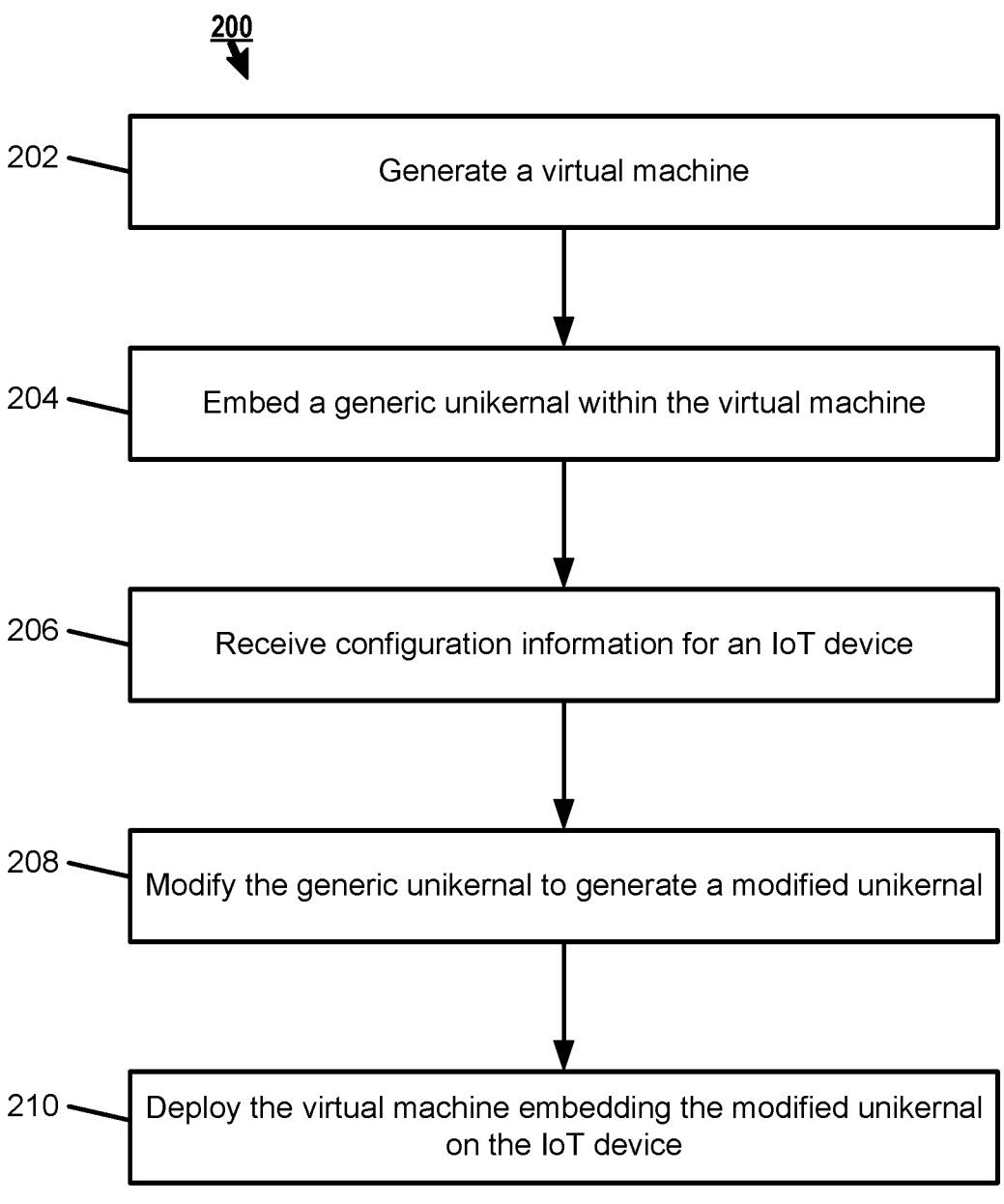
FIG. 2 is a flow chart illustrating an example process for managing IoT devices using a polymorphic unikernal service system, according to an example embodiment of the present disclosure.

FIG. 2 is a flow chart illustrating an example process 200 for managing IoT devices using a polymorphic unikernal service system, according to an example embodiment of the present disclosure. In some embodiments, one or more blocks of process 200 may be performed by the PUS system 102 (e.g., via the processor 104 based on instructions stored in memory 106).

Process 200 may begin with the PUS system 102 generating a virtual machine (block 202). For example, the VM generation module 114 may partition resources (e.g., memory 106, processor 104) to run or provision one or more instances of virtual machines.

At block 204, the PUS system 102 may embed a generic unikernel within the virtual machine. For example, the PUS system 102 (e.g., via the embedding module 122) may retrieve a unikernel (e.g., from unikernel database 110) and may cause the generic unikernel to control one or more operations of the virtual machine. In some embodiments, selection of a generic unikernel, from among the plurality of unikernels stored within the unikernel database 110, may be based on information concerning one or more IoT devices managed by the PUS system 102. For example, the PUS system may have received a request from an IoT device for a unikernel. The PUS system 102 may rely on previously stored information about the IoT device to select a unikernel that has parameters that are compatible with the IoT device according to the previously stored information. As will be discussed in relation to FIG. 3, previously stored information about an IoT device may be received as a result of the PUS system 102 interrogating and monitoring the IoT devices for network and/or hardware capabilities.

At block 206, the PUS system 102 may receive configuration information for an IoT device. The configuration information may be in the form of a configuration file and may be received from the IoT device via the communication network 130 (e.g., in response to a periodic or previous sent query for information concerning networking and hardware capabilities of the IoT device). In some embodiments, the configuration information for an IoT device may be received via user input. For example, a user operating an IoT device may desire a specific modification for the unikernel and may input (e.g., via a user interface) the configuration information. Also or alternatively, the user input may directly indicate the parameters of the unikernel that is desired to be modified, and to what degree.

At block 208, the PUS system 102 may modify the generic unikernel to generate a modified unikernel. The modification may be based on the configuration information for the IoT device, as received in block 206. In some embodiments, the modification may be performed by the PUS system 102 (e.g., via the unikernel specialization module 116) changing one or more parameters associated with the unikernel so that the unikernel is rendered compatible with the configuration of the IoT device, as received in block 206. As used herein, the configuration of the IoT device may refer to one or more characteristics of a hardware capability of the IoT device or one or more characteristics of a network capability of the IoT device. Rendering a unikernel as compatible with a configuration may thus cause the unikernel to have network or hardware capability requirements that are able to be met or satisfied by the IoT device. Also or alternatively, rendering the unikernel to be compatible with the configuration may cause the unikernel to provide functionalities that are desired or needed by the IoT device. Thus, the unikernels may be customized according to the needs and/or requirements of the IoT device. For example, unikernels can be optimized for data traffic (e.g., for an IoT device that functions as a relay point), power management (e.g., for IoT devices with low power capabilities), sensor fidelity (e.g., for IoT devices with acute or sensitive sensors), and the like.

At block 210, the PUS system 102 may deploy the virtual machine embedding the modified unikernel on to the IoT device. For example, the PUS system 102 (e.g., via the deployment module 124) may cause the IoT device to run the virtual machine embedded with the modified unikernel. Also or alternatively, the IoT device may be given privileges to access or share a running instance of the virtual machine on the host PUS system 102.

Figure 3:
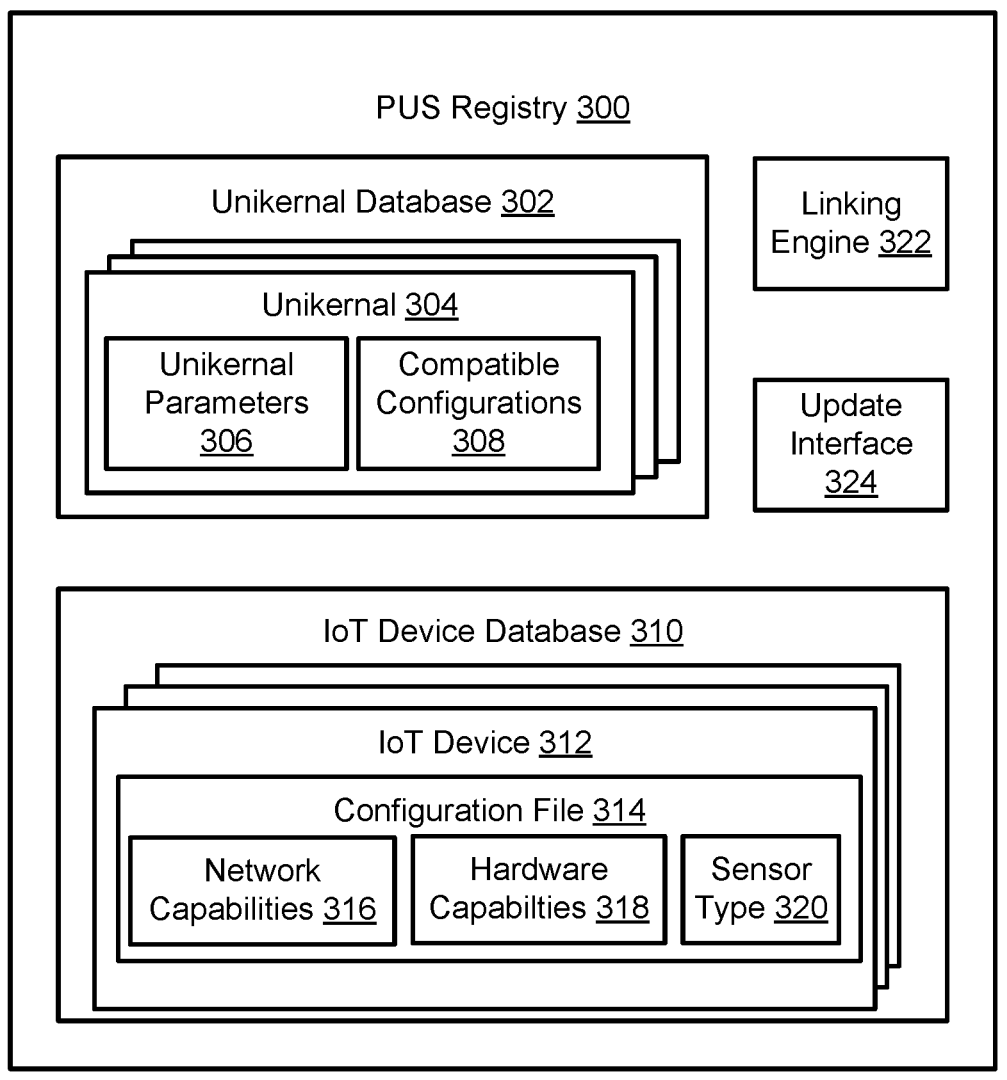
FIG. 3 is a block diagram showing one or more components of an example registry of the polymorphic unikernal service system, according to an example embodiment of the present disclosure.

FIG. 3 is a block diagram showing one or more components of an example registry 300 of the polymorphic unikernel service system, according to an example embodiment of the present disclosure. The PUS registry 300 may allow the PUS system 102 to retrieve unikernels (e.g., generic unikernels) for further customization, store a record of all IoT devices in the network managed by the PUS system 102 (e.g., to prevent unauthorized nodes from entering the network), interrogate and store the latest configuration information for the IoT devices, and link various data stored in databases of the registry 300, and facilitate the updating of the registry 300. For example, the PUS registry may include the unikernel database 302 and the IoT device database 310, which may share the functions and components previously described and attributed to unikernel database 110 and IoT device database 112, respectively. The PUS registry 300 may further include a linking engine 322 and an update interface 324. The linking engine 322 may comprise a program, application, software, or code that may periodically form linkages or associations between one data entry or data structure (e.g., a configuration of an IoT device) with another data entry or data structure (e.g., unikernel that is compatible with the configuration). The update interface 324 may comprise any application, program, software, code, or plug-in used to allow an operator or an external system to update one or more databases or repositories of PUS registry 300 (e.g., the unikernel database 110 and the IoT device database 112).

The unikernel database 302 may store a plurality of unikernels 304. Each unikernel may be characterized by a set of unikernel paramaters 306. Such parameters may include, for example, a set of libraries corresponding to operating system services. The services chosen, via the selection of libraries, may differ based on the needs of the IoT device, and thus the unikernel may be customized accordingly. In some emnodiments, the parameters for a unikernel may further include, but are not limited to, security parameters, keys, IT policy, HTTPS gateway interface requirements, memory interface/storage, and/or data schemas. In some aspects, the selection or emphasis of some parameters and the deactivation, non-selection, or de-emphasis of other parameters may lead to specialized unikernels, for example, to service IoT devices with specific compatibility requirements or needs. For example, unikernels can be optimized for data traffic (e.g., for an IoT device that functions as a relay point), power management (e.g., for IoT devices with low power capabilities), sensor fidelity (e.g., for IoT devices with acute or sensitive sensors), and the like. Each unikernel stored in the unikernel database 302 may also be associated with one or more compatible configurations 308. For example, the one or more parameters for a given unikernel may allow the unikernel to be compatible to a set of hardware and/or network capabilities. That set may be indicated, e.g., as metadata, or otherwise recorded in the unikernel database 302. For example, when a generic unikernel is retrieved and embedded to a virtual machine (e.g., as in block 204 of process 200), knowledge of compatible configurations may be used to determine which unikernal to be retrieved (e.g., if an IoT device for which the unikernal is customized is known).

The IoT device database 310 may comprise a record of one or more IoT devices 312 managed by or known to be part of the node network managed by the PUS system 102. Each IoT device may be characterized by its network capabilities 316 and hardware capabilities 318. The network capability may refer to what function an IoT device serves within the node network. In some aspects, the network capability may also refer to or include the strength of its ability to send communication to other nodes of the network (e.g., the range and speed of communication). The hardware capability may refer to resource constraints of the IoT device (e.g., memory, processor speed, etc.) and/or any unique components or functionalities of the IoT device. In some embodiments, the IoT device may include and a sensor. The sensor type 320 and associated quality metrics may be included as part of the configuration for the IoT device. In some aspects, the configuration of the IoT device may be stored as part of a configuration file 314. A copy of the configuration file 314 may be sent to the PUS system 102, e.g., in response to periodic interrogation or monitoring.

Figure 4:
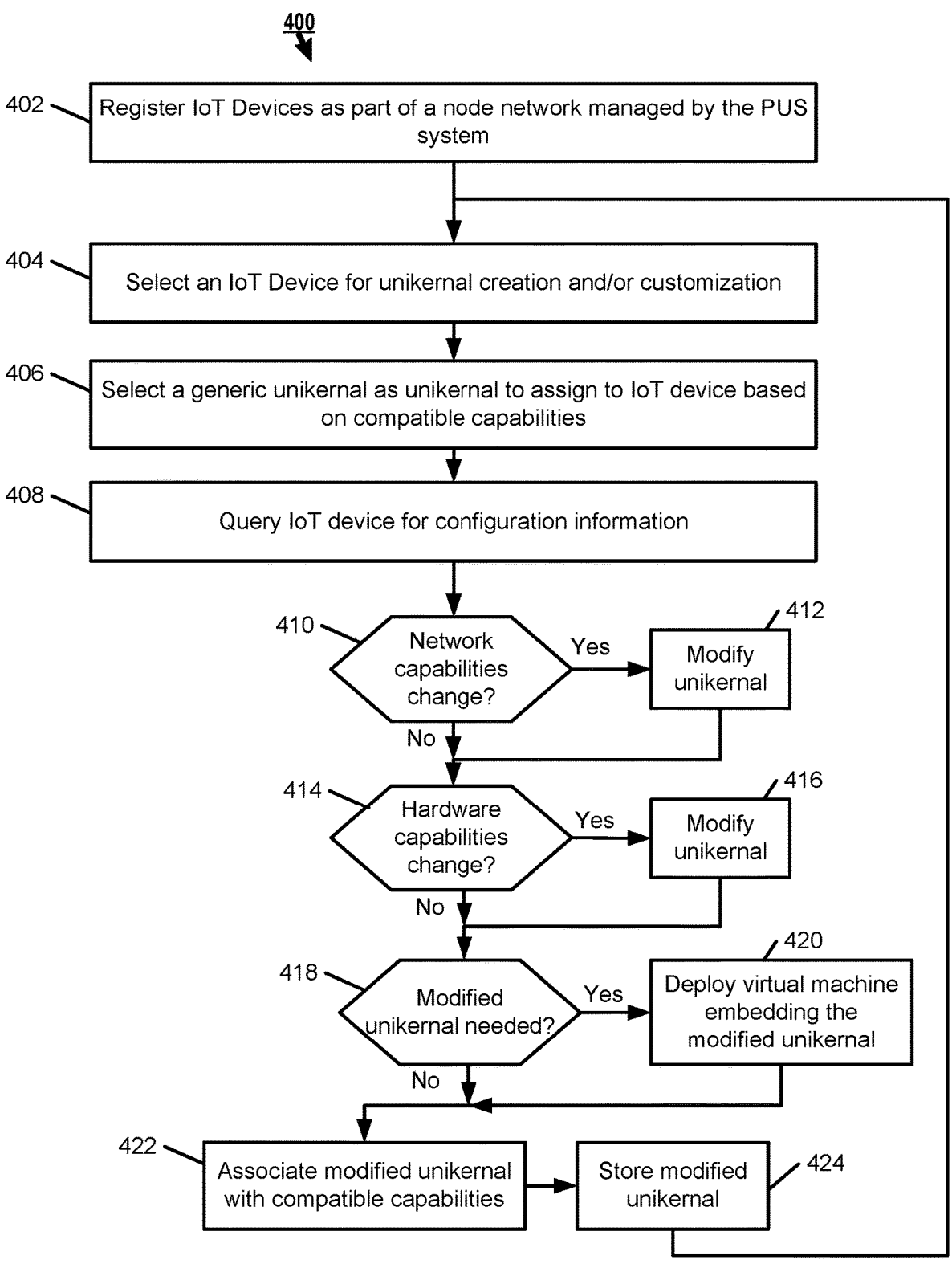
FIG. 4 is a flow chart illustrating an example process for modifying and creating unikernals for the polymorphic unikernal service system, according to an example embodiment of the present disclosure.

FIG. 4 is a flow chart illustrating an example process 400 for modifying and creating unikernals for the polymorphic unikernal service system, according to an example embodiment of the present disclosure. In some embodiments, one or more blocks of process 400 may be performed by the PUS system 102 (e.g., via the processor 104 based on instructions stored in memory 106).

Process 400 may begin with the PUS system 102 registering IoT devices as part of a network managed by the PUS system 102. The registration may allow the PUS system 102 to monitor the configuration of, and deploying virtual machines embedding customized unikernals to, IoT devices within the node network. Furthermore, the registration may prevent unauthorized devices from availing the benefits of the customized unikernals generated by the PUS system 102, as discussed herein, thereby making the node network more resilient to DDOS and other security attacks. In some aspects, registration may be prompted by the IoT device entering an area covered by the communication network associated with the PUS system 102. For example, an operator of the PUS system 102 may be prompted with the option to add a previously unrecognized IoT device to a node network.

At block 404, the PUS server may select an IoT device (from within the node network) for unikernal creation and/or customization. The selection may be random or may be based on a prescribed order, which may be based on device identifiers of the IoT devices, a time of registration, or urgency of need from the IoT device. In some embodiments, the PUS system multiple IoT devices may be selected, and thus subsequent steps may be completed for the IoT devices in parallel. In either case, the selected IoT device and its last known configurations may be identified (e.g., via the IoT device database 310).

At block 406, the PUS system 102 may select a generic unikernal (e.g., from unikernal database 302) to assign to the IoT device based on compatible capabilities. For example, a generic unikernal may be retrieved and/or provisioned for the IoT device and then embedded in a virtual machine. A generic unikernal may be selected by determining whether there is a match between the compatible configurations 308 associated with the unikernal and the last known configuration of the IoT device.

At block 408, the PUS system 102 may query the IoT device for configuration information. The querying (e.g., interrogation) may occur on a periodic basis based on predefined intervals. The query may cause the IoT device to respond with configuration information, which may be delivered to the PUS system 102 as a configuration file. In at least one embodiment, based on the response, the PUS system 102 may be able to determine whether the network capabilities of the IoT device has changed (block 410) and whether hardware capabilities associated with the IoT device has changed (block 414). If either the network capabilities or the hardware capabilities have changed, the PUS system 102 may modify the unikernal accordingly (e.g., as in blocks 412 and 416, respectively). As previously discussed, the modification of the unikernal may cause a change in the parameters of the unikernal so that the unikernal is rendered compatible with the identified change in the IoT device. In some aspects, no modifications to the unikernal may be needed even if there was a change in the network capability or hardware capability.

At block 418, the PUS system 102 may determine whether the modified unikernal is needed by the IoT device. For example, the IoT device may send a request to the PUS system 102 for an updated unikernal (e.g., to maintain the resilience of the IoT device to security threats). Also or alternatively, the PUS system 102 may determine, based on the monitored and identified changes to the configuration of the IoT device that an updated unikernal is needed by the IoT device to safeguard the IoT device from threats.

If the modified unikernal is needed, the PUS system 102 may deploy the virtual machine embedding the modified unikernal to the IoT device (block 420). For example, the PUS system 102 (e.g., via the deployment module 124) may cause the IoT device to run the virtual machine embedded with the modified unikernal. Also or alternatively, the IoT device may be given privileges to access or share a running instance of the virtual machine on the host PUS system 102.

At block 422, the modified unikernal may be associated (e.g., as being compatible) with the configurations of the IoT device. The modified unikernal may then be stored in the unikernal database 302 (e.g., for future use) (block 424). For example, the PUS system 102 may indicate, in a data structure corresponding to the modified unikernal in the unikernal database 302) that the compatible configurations include those of the IoT device. Thus, if a generic unikernal is needed for another (second) IoT device, and the second IoT device shares the configurations of the original IoT device, the modified unikernal stored at block 424 may be retrieved as the generic unikernal (before subsequent customization in accordance with any additional configurations of the second IoT device).

Figure 5:
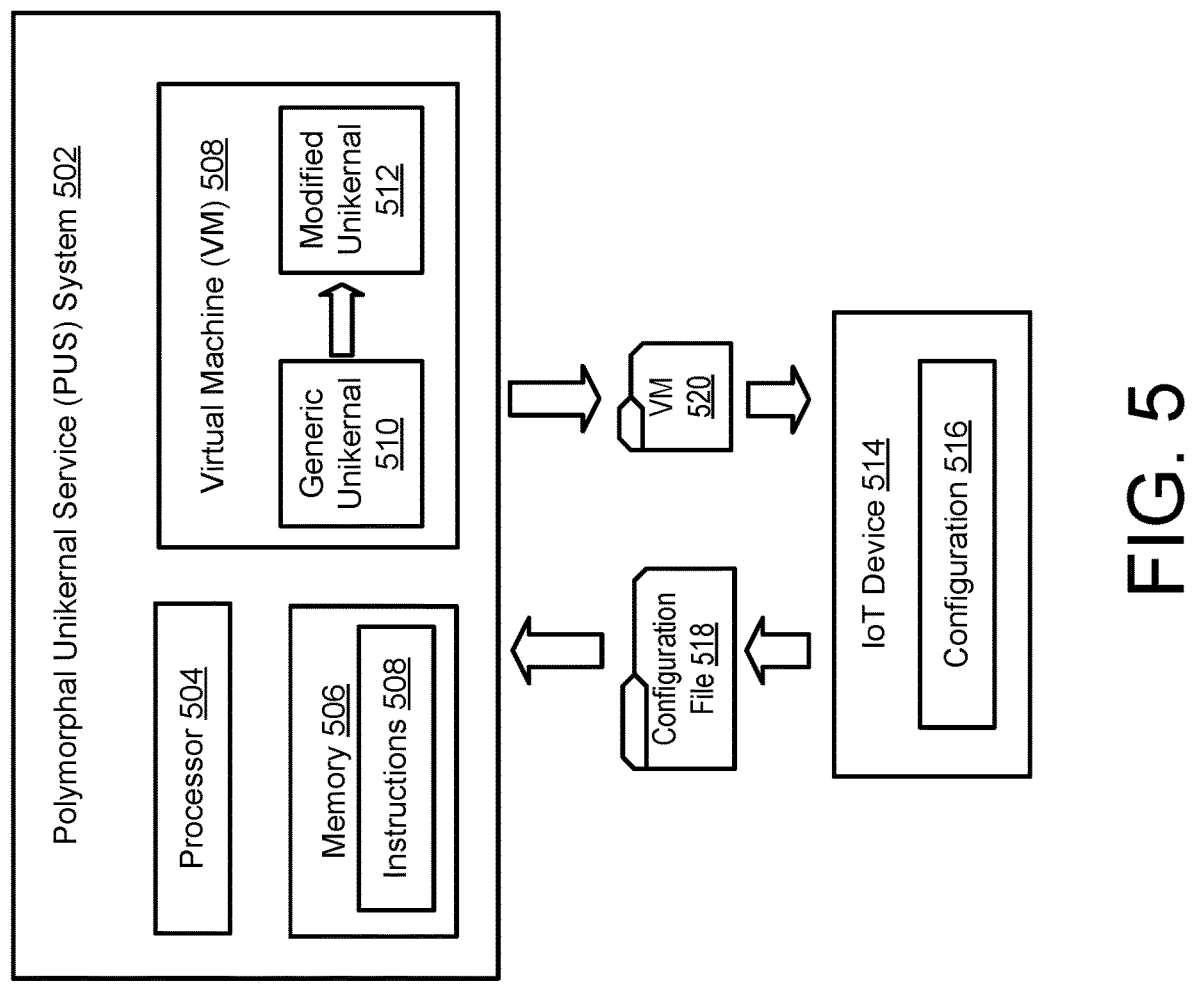
FIG. 5 is a block diagram showing one or more components of a polymorphic unikernal service system, according to an example embodiment of the present disclosure.

FIG. 5 is a block diagram showing one or more components of a polymorphic unikernal service (PUS) system 502, according to an example embodiment of the present disclosure. As shown in FIG. 5, the PUS system 502, which may share components or functionalities of previously described PUS system 102, may comprise a processor 504 and a memory 506. The memory 506 may store instructions 508 that, when executed by the processor 504, can cause the processor 504 to perform one or more processes described herein. For example, the instructions 508 may cause the processor 504 to generate a virtual machine 508; and embed a generic unikernal 510 within the virtual machine 508. The instructions 508 may further cause the processor 504 to receive, from an Internet of Things (IoT) device 514 communicatively linked to the PUS system 502, a configuration file 518 indicating a configuration 516 of the IoT device 514. The instructions 508 may cause the processor 504 to modify, based on the configuration 516 of the IoT device 514, the generic unikernal 510 to generate a modified unikernal 512. The virtual machine 508 may be deployed on the IoT device (e.g., as shown in virtual machine 520). Moreover, the virtual machine 508/520 may embed the modified unikernal 512.

It will be appreciated that all of the disclosed methods and procedures described herein can be implemented using one or more computer programs or components. These components may be provided as a series of computer instructions on any conventional computer readable medium or machine-readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be configured to be executed by one or more processors, which when executing the series of computer instructions, performs or facilitates the performance of all or part of the disclosed methods and procedures.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

What is claimed is as follows:

1. A method comprising:
   registering, by a polymorphic unikernel service (PUS) system, an Internet of Things (IoT) device in a registry of the PUS system;
   receiving first configuration information indicating a first configuration of the IoT device at a first point in time;
   after receiving the first configuration information, receiving a request to provide a unikernel to the IoT device; and
   in response to receiving the request:
      selecting, by the PUS system, an existing unikernel for use as a generic unikernel from among a plurality of unikernels stored in a unikernel database, wherein the existing unikernel is selected based on the existing unikernel being compatible with the first configuration of the IoT device;
      based on selecting the generic unikernel, embedding the generic unikernel within a virtual machine;
      subsequent to embedding the generic unikernel within the virtual machine and prior to deploying the virtual machine to the IoT device, receiving second configuration information indicating a second configuration of the IoT device at a second point in time that is subsequent to the first point in time, wherein the second configuration is different from the first configuration;
      modifying, by the PUS system and based on the second configuration of the IoT device, the generic unikernel to generate a modified unikernel; and
      deploying the virtual machine on the IoT device, wherein the virtual machine embeds the modified unikernel.

2. The method of claim 1, further comprising:
   interrogating, by the PUS system, each of a plurality of IoT devices, including the IoT device, for hardware capabilities for the respective IoT devices; and

receiving, from each of the plurality of IoT devices, a respective response to the interrogation;
   wherein the second configuration information is derived from a response to the interrogation.

3. The method of claim 1, further comprising:
   identifying, by the PUS system, the IoT device from among a plurality of IoT devices communicatively coupled to the PUS system and registered in the registry stored by the PUS system.

4. The method of claim 3, wherein embedding the generic unikernel comprises:
   selecting, from the registry, the existing unikernel as the generic unikernal based on an association in the registry between the IoT device and the existing unikernel.

5. The method of claim 1, further comprising:
   receiving, via user input, a desired modification for the generic unikernel; and
   modifying, by the PUS system and based on the desired modification, the generic unikernel to generate a second modified unikernel.

6. The method of claim 5, further comprising:
   receiving, via user input, a desired IoT device for deployment, wherein the desired IoT device is selected from among a plurality of IoT devices communicatively linked to the PUS system, wherein the virtual machine further embeds the second modified unikernel.

7. The method of claim 1, further comprising:
   receiving, by the PUS system, one or more network conditions associated with the IoT device.

8. The method of claim 7, wherein the generic unikernel is created based on the one or more network conditions.

9. The method of claim 7, wherein the modified unikernel is further modified based on the one or more network conditions.

10. The method of claim 1, wherein the generic unikernel is created based on previous blocks of application binary for specific functions.

11. A polymorphic unikernel service (PUS) system comprising:
    a processor; and
    a memory storing instructions which, when executed by the processor, cause the processor to:
       register an Internet of Things (IOT) device in a registry of the PUS system;
       receive first configuration information indicating a first configuration of the IoT device at a first point in time;
       after receiving the first configuration information, receive a request to provide a unikernel to the IoT device; and
       in response to receiving the request:
          select an existing unikernel for use as a generic unikernel from among a plurality of unikernels stored in a unikernel database, wherein the existing unikernel is selected based on the existing unikernel being compatible with the first configuration of the IoT device;
          based on selecting the generic unikernel, embed the generic unikernel within a virtual machine;
          subsequent to embedding the generic unikernel within the virtual machine and prior to deploying the virtual machine to the IoT device, receive second configuration information indicating a second configuration of the IoT device at a second point in time that is subsequent to the first point in time, wherein the second configuration is different from the first configuration;

modify, based on the second configuration of the IoT device, the generic unikernel to generate a modified unikernel; and deploy the virtual machine on the IoT device, wherein the virtual machine embeds the modified unikernel.

12. The PUS system of claim 11, wherein the instructions, when executed, further cause the processor to:

interrogate each of a plurality of IoT devices, including the IoT device, for hardware capabilities for the respective IoT devices; and receive, from each of the plurality of IoT devices, a respective response to the interrogation;

wherein the second configuration information is derived from a response to the interrogation.

13. The PUS system of claim 11, wherein the instructions, when executed, further cause the processor to:

identify the IoT device from among a plurality of IoT devices communicatively coupled to the PUS system and registered in the registry stored by the PUS system.

14. The PUS system of claim 13, wherein embedding the generic unikernel comprises:

selecting, from the registry, the existing unikernel as the generic unikernel based on an association in the registry between the IoT device and the existing unikernel.

15. The PUS system of claim 11, wherein the instructions, when executed, further cause the processor to:

receive, via user input, a desired modification for the generic unikernel; and modify, based on the desired modification, the generic unikernel to generate a second modified unikernel.

16. The PUS system of claim 15, wherein the instructions, when executed, further cause the processor to:

receive, via user input, a desired IoT device for deployment, wherein the desired IoT device is selected from among a plurality of IoT devices communicatively linked to the PUS system, wherein the virtual machine further embeds the second modified unikernel.

17. The PUS system of claim 11, wherein the instructions, when executed, further cause the processor to:

receive one or more network conditions associated with the IoT device.

18. The PUS system of claim 17, wherein the generic unikernel is created based on the one or more network conditions.

19. The PUS system of claim 17, wherein the modified unikernel is further modified based on the one or more network conditions.

20. A non-transitory, computer-readable medium storing instructions which, when executed by a processor, cause the processor to:

register an Internet of Things (IoT) device in a registry;

receive first configuration information indicating a first configuration of the IoT device at a first point in time;

after receiving the first configuration information, receive a request to provide a unikernel to the IoT device; and in response to receiving the request:

select an existing unikernel for use as a generic unikernel from among a plurality of unikernels stored in a unikernel database, wherein the existing unikernel is selected based on the existing unikernel being compatible with the first configuration of the IoT device;

based on selecting the generic unikernel, embed the generic unikernel within a virtual machine;

subsequent to embedding the generic unikernel within the virtual machine and prior to deploying the virtual machine to the IoT device, receive second configuration information indicating a second configuration of the IoT device at a second point in time that is subsequent to the first point in time, wherein the second configuration is different from the first configuration;

modify, based on the second configuration of the IoT device, the generic unikernel to generate a modified unikernel; and deploy the virtual machine on the IoT device, wherein the virtual machine embeds the modified unikernel.

* * * * *